(12) United States Patent
Kim et al.

(10) Patent No.: US 10,886,802 B2
(45) Date of Patent: Jan. 5, 2021

(54) ROTOR FOR AN ELECTRIC MACHINE

(71) Applicant: GM GLOBAL TECHNOLOGY OPERATIONS LLC, Detroit, MI (US)

(72) Inventors: Jihyun Kim, Rochester Hills, MI (US); Michael C. Muir, Troy, MI (US); Yew Sum Leong, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 15/895,400

(22) Filed: Feb. 13, 2018

(65) Prior Publication Data
US 2019/0252935 A1 Aug. 15, 2019

(51) Int. Cl.
*H02K 1/27* (2006.01)
*H02K 3/34* (2006.01)
*H02K 7/14* (2006.01)

(52) U.S. Cl.
CPC .......... *H02K 1/2766* (2013.01); *H02K 3/345* (2013.01); *H02K 7/14* (2013.01)

(58) Field of Classification Search
CPC .. H02K 1/27; H02K 3/34; H02K 7/14; H02K 3/345; H02K 1/2766
USPC ............ 310/156.57, 156.74, 156.83, 156.53, 310/156.56
See application file for complete search history.

(56) References Cited

U.S. PATENT DOCUMENTS

| | | | | |
|---|---|---|---|---|
| 7,362,025 B2* | 4/2008 | Utaka | .................... | H02K 1/276 310/156.45 |
| 7,795,772 B2* | 9/2010 | Arimitsu | ................ | H02K 1/276 310/156.53 |
| 7,851,960 B2* | 12/2010 | Lee | ......................... | H02K 1/246 310/156.53 |
| 8,772,994 B2* | 7/2014 | Feng | ...................... | H02K 1/276 310/156.53 |
| 8,847,454 B2* | 9/2014 | Saito | ...................... | H02K 1/276 310/156.57 |
| 8,890,385 B2* | 11/2014 | Sano | .................... | H02K 1/2766 310/156.07 |
| 2007/0273232 A1 | 11/2007 | Ong et al. | | |
| 2009/0152972 A1* | 6/2009 | Nishijima | .............. | H02K 1/276 310/156.57 |
| 2014/0077653 A1* | 3/2014 | Takahashi | ............ | H02K 1/2766 310/156.53 |
| 2014/0111050 A1 | 4/2014 | Chamberlin | | |
| 2014/0217849 A1* | 8/2014 | Soma | ..................... | H02K 1/276 310/156.53 |
| 2017/0179779 A1 | 6/2017 | Kaiser et al. | | |

* cited by examiner

*Primary Examiner* — Naishadh N Desai
(74) *Attorney, Agent, or Firm* — Quinn IP Law (57) ABSTRACT

A rotor for an electric machine comprises a rotor core that defines a rotor slot having a central portion and an end portion. The end portion has a maximum width that is greater than a maximum width of the central portion immediately adjacent the end portion. A perimeter of the rotor slot at the end portion includes a plurality of segments extending between a first extremity at the maximum width of the end portion and a second extremity at the maximum width of the end portion. The plurality of segments include segments with different radii that decrease in magnitude from the center axis to the first extremity, and from the center axis to the second extremity.

18 Claims, 4 Drawing Sheets

ROTOR FOR AN ELECTRIC MACHINE

GOVERNMENT FUNDING

This disclosure was made with Government support under Agreement No. DE-EE0007757 awarded by the United States Department of Energy. The Government may have certain rights in the disclosure.

INTRODUCTION

An electric machine functions as a motor by utilizing electrical energy to produce mechanical torque through the interaction of rotor magnetic fields and stator fields produced by electric current-carrying conductors. Some electric motors may also function as generators by using torque to produce electrical energy. An electric machine such as an interior permanent magnet machine or a synchronous machine has a rotor assembly that includes a rotor core with magnets of alternating polarity spaced around the rotor core. Some rotor cores define slots that act as barrier layers for magnetic fields. Some of the slots may contain the magnets.

SUMMARY

Stress levels in a rotor core due to centrifugal force are often highest at a web or at a bridge of the rotor core. Increasing the thickness of the web or bridge, or increasing the arc radius of the slot that partially defines the web or bridge may reduce stress, but not without a torque reduction due to increased flux leakage. A rotor for an electric machine disclosed herein is configured to reduce mechanical stress levels in the rotor core, especially at a web and/or a bridge of the rotor core, while resulting in a reduction of flux leakage due to increased magnetic resistance, thereby increasing motor torque and power and increasing operating speed.

The rotor comprises a rotor core that defines a rotor slot having a central portion and an end portion. The end portion has a maximum width that is greater than a maximum width of the central portion immediately adjacent the end portion. A perimeter of the rotor slot at the end portion includes a plurality of segments extending between a first extremity at the maximum width of the end portion and a second extremity at the maximum width of the end portion. The plurality of segments include segments that have different radii that decrease in magnitude from the center axis to the first extremity, and from the center axis to the second extremity.

In one or more embodiments, the center axis of the rotor slot is arcuate. For example, the center axis may curve outward, away from an axis of rotation of the rotor core. In other embodiments, the center axis could be linear segments or other shapes.

In one or more embodiments, each point of the perimeter of the rotor slot along the plurality of segments is in a tangency condition to the radius at the point. Stated differently, a line may be drawn tangent to the perimeter of the rotor slot at every point along the segments of different radii, including each point at which two adjacent segments meet. In such an embodiment, there are no step changes along the plurality of segments, which may reduce rotational stress concentration.

In one or more embodiments, the radii of a first set of the plurality of segments between the center axis and the first extremity are different than the radii of a set portion of the plurality of segments between the center axis and the second extremity such that the end portion is asymmetrical.

In one or more embodiments, the perimeter of the rotor slot has a first inflection point between a first side of the central portion and the end portion, and a second inflection point between a second side of the central portion and the end portion.

In one or more embodiments, the rotor slot is a first rotor slot, and the rotor core further defines a second rotor slot having a central portion and an end portion. The end portion of the second rotor slot is separated from the end portion of the first rotor slot by a web of the rotor core. The end portion of the second rotor slot has a maximum width that is greater than a maximum width of the central portion of the second rotor slot immediately adjacent the end portion of the second rotor slot. A perimeter of the second rotor slot at the end portion of the second rotor slot includes a plurality of segments extending between a first extremity at the maximum width of the end portion of the second rotor slot and a second extremity at the maximum width of the end portion of the second rotor slot, the plurality of segments of the perimeter of the second rotor slot at the end portion of the second rotor slot have different radii that decrease in magnitude from a center axis of the second rotor slot to the first extremity at the maximum width of the end portion of the second rotor slot, and from the center axis of the second rotor slot to the second extremity at the maximum width of the end portion of the second rotor slot.

In one or more embodiments, the rotor core further defines a third rotor slot. The third rotor slot and the second rotor slot are symmetrical with one another relative to the first rotor slot. The end portion of the first rotor slot is a first end portion, the web is a first web, and the first rotor slot has a second end portion configured symmetrically to the first end portion and separated from the third rotor slot by a second web of the rotor core.

In one or more embodiments, the end portion is adjacent to an outer surface of the rotor core such that the rotor core includes a bridge between the end portion and the outer surface. The segments of the perimeter of the end portion with the different radii may reduce stress concentrations at the bridge as discussed herein. Accordingly, the end portion may be adjacent a web or a bridge, or rotor slots may include end portions as described at both webs and bridges.

In one or more embodiments, the end portion is a first end portion, and the rotor slot has a second end portion configured symmetrically to the first end portion. The center axis of the central portion is arcuate, with the central portion closer to the axis of rotation than the first end portion and the second end portion.

In one or more embodiments, the rotor slot is the first rotor slot of a plurality of rotor slots in the rotor core, the plurality of rotor slots further including a second rotor slot and a third rotor slot, with the first rotor slot between the second rotor slot and the third rotor slot. A first end portion of the second rotor slot is adjacent to the first end portion of the first rotor slot, and a perimeter of the second rotor slot at the first end portion of the second rotor slot has a maximum width greater than a maximum width of a central portion of the second rotor slot immediately adjacent the first end portion of the second rotor slot such that the rotor core has a first web bounded by the first end portion of the first rotor slot and the first end portion of the second rotor slot. A first end portion of the third rotor slot is adjacent to the second end portion of the first rotor slot, and a perimeter of the third rotor slot at the first end portion of the third rotor slot has a maximum width greater than a maximum width of a central portion of the third rotor slot immediately adjacent the first end portion of the third rotor slot such that the rotor core has a second web bounded by the second end portion of the first rotor slot and the first end portion of the third rotor slot.

In one or more embodiments, a center axis of each of the first, second, and third rotor slots is arranged along an arcuate curve that is convex toward the axis of rotation.

In one or more embodiments, the rotor further comprises a magnet disposed in the first rotor slot, and the second rotor slot and the third rotor slot are each free of any magnet. In other embodiments, however, the relative positions of the rotor slots and the magnets may be different.

In one or more embodiments, the rotor core defines a plurality of rotor slots arranged in rows of three, each row including a central rotor slot, a first outer rotor slot, and a second outer rotor slot, with the central rotor slot between the first outer rotor slot and a second outer rotor slot. The rotor core includes a first web between the central rotor slot and the first outer rotor slot, a second web between the central rotor slot and the second outer rotor slot, a first bridge between the first outer rotor slot and an outer perimeter of the rotor core, and a second bridge between the second outer rotor slot and the outer perimeter of the rotor core. The rotor slot is the central rotor slot of an innermost row of the rows of three closest to the axis of rotation of the rotor core, and the end portion is a first end portion of the central rotor slot. The central rotor slot has a second end portion configured symmetrically to the first end portion of the central rotor slot. A perimeter of the first outer rotor slot at a first end portion of the first outer rotor adjacent the first web includes a plurality of segments each having a different radius, and a perimeter of the second outer rotor slot at a first end portion of the second outer rotor slot adjacent the second web includes a plurality of segments each having a different radius. The first outer rotor slot tapers in width from the first end portion of the first outer rotor slot to the first bridge, and the second outer rotor slot tapers in width from the first end portion of the second outer rotor slot to the second bridge.

In one or more embodiments, the rotor core includes four rows of rotor slots between the axis of rotation and the outer perimeter of the rotor core at each of the rotor poles, and the rotor further comprises respective magnets disposed in the central rotor slot of each row, with the first outer rotor slot and the second outer rotor slot each free of any magnet. For example, the first outer rotor slot and the second outer rotor slot may be air barrier layers that do not contain any magnets.

Within the scope of the present teachings, an electric machine comprises a rotor that includes a rotor core and magnets. The rotor core defines a plurality of rotor slots extending therethrough and disposed between an inner surface of the rotor core and an outer surface of the rotor core. The magnets are supported by the rotor core in at least some of the rotor slots of the plurality of rotor slots. The magnets are spaced around an axis of rotation of the rotor core to define a number of rotor poles. The plurality of rotor slots includes a first rotor slot having a central portion and an end portion. The end portion has a maximum width that is greater than a maximum width of the central portion immediately adjacent the end portion. The maximum width of the central portion of the second rotor slot is perpendicular to a center axis of the central portion of the second rotor slot, and the maximum width of the end portion of the second rotor slot is parallel to the maximum width of the central portion. A perimeter of the first rotor slot at the end portion includes a plurality of segments extending between a first extremity at the maximum width of the end portion and a second extremity at the maximum width of the end portion. The plurality of segments include segments having different radii. The radii decrease in magnitude from the arcuate center axis to the first extremity, and from the arcuate center axis to the second extremity. Each point of the perimeter of the first rotor slot along the segments of different radii is in a tangency condition to the radius at the point. The perimeter of the first rotor slot has a first inflection point between a first side of the central portion and the end portion, and a second inflection point between a second side of the central portion and the end portion.

The above features and advantages and other features and advantages of the present disclosure are readily apparent from the following detailed description of the best modes for carrying out the disclosure when taken in connection with the accompanying drawings.

DETAILED DESCRIPTION

Figure 1:
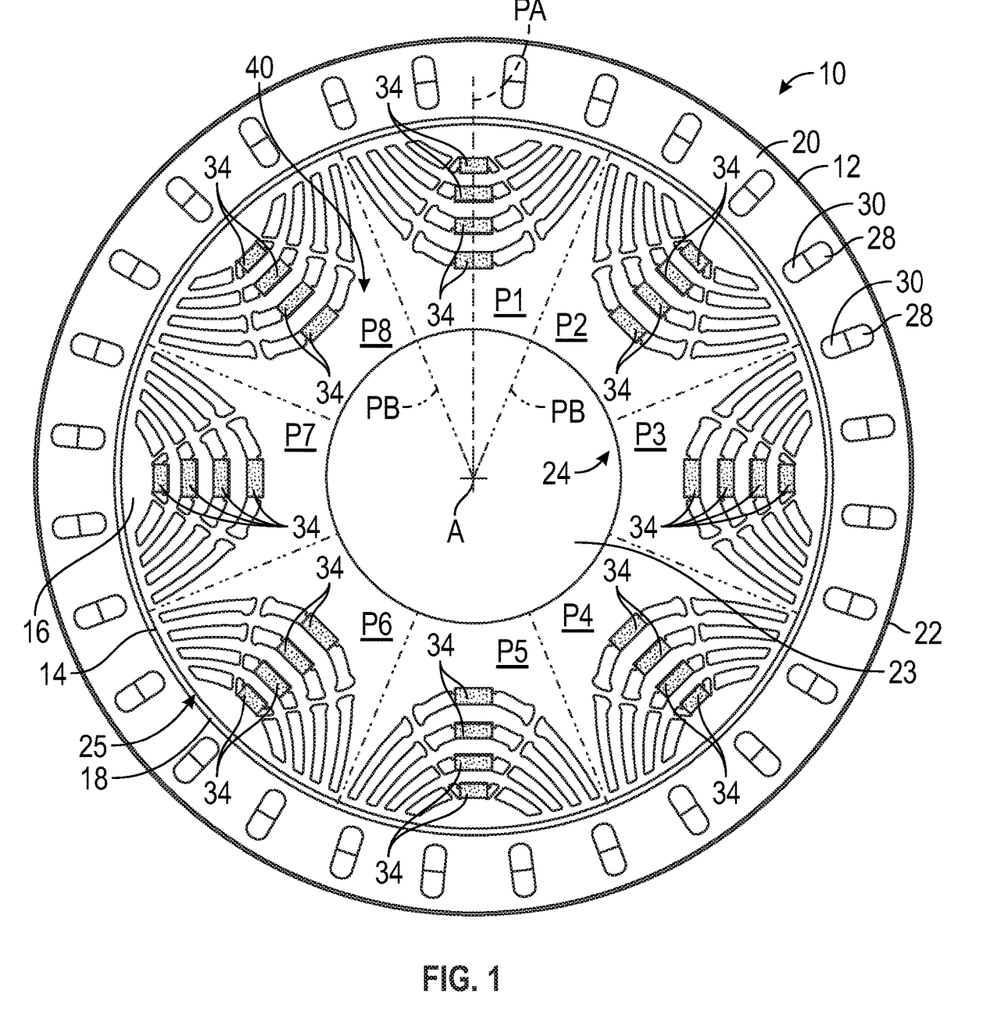
FIG. 1 is a schematic illustration in side view of an electric machine in accordance with the present teachings.

Referring to the drawings, wherein like reference numbers refer to like components throughout the views, FIG. 1 shows an electric machine 10 having a stator 12 and a rotor 14. The electric machine 10 may be a permanent magnet and/or synchronous reluctance electric machine configured to operate as a motor and, optionally, as a generator. As discussed herein, the rotor 14 includes a rotor core 16 configured to reduce rotational stress in the rotor core 16 without reducing operating efficiency and motor torque and power.

The stator 12 radially surrounds the rotor 14 with an air gap 18 defined therebetween. Both the stator 12 and the rotor 14 are generally annular in shape and are concentric about an axis of rotation A of the rotor 14. The stator 12 includes a stator core 20 and the rotor 14 includes the rotor core 16. Both the stator core 20 and the rotor core 16 may be assembled from multiple laminations stacked axially along the axis of rotation A. A motor housing (not shown) may radially surround an outer periphery 22 of the stator laminations and may support a motor shaft of the electric machine 10. For example, the rotor core 16 may be rigidly connected to and rotate with a motor shaft (not shown) that extends through a shaft opening 23 in the rotor core 16 defined at an inner surface 24 of the rotor core 16. The material of the rotor core 16 around the shaft opening 23 functions as a center shaft support. The rotor core 16 extends radially from the inner surface 24 to an outer surface 25 at the air gap 18.

The stator core 20 has multiple circumferentially-spaced stator slots 28. The stator slots 28 extend lengthwise parallel to the axis A. The stator slots 28 are configured to house multi-phase stator windings 30. The stator windings 30 may be grouped into different sets, each of which carry an identical number of phases of electrical current, such as three phases, as is understood by those skilled in the art.

Referring to FIG. 1, the rotor 14 is shown as having eight poles P1, P2, P3, P4, P5, P6, P7 and P8 established at least partially by magnets 34 disposed in rotor slots as discussed herein. Although eight poles are shown, the rotor 14 may be configured to have a different number of poles. Each pole P1-P8 extends circumferentially to pole boundaries PB indicated with phantom lines extending radially through the rotor core 16. Each pole includes the material of the rotor core 16 bounded by the respective pole boundaries PB of the pole. A pole axis PA of one of the poles P1 is shown, although each pole has a similar pole axis extending radially through the center of the pole. The rotor core 16 may be a steel material selected to maintain rotational stress within predetermined limits.

The rotor core 16 is configured to support multiple magnets 34 spaced around the rotor core 16. Specifically, each pole P1-P8 of the rotor core 16 has a plurality of rotor slots that are arranged in rows of three. The rotor slots of each row extend along a respective arcuate center axis 38A, 38B, 38C, 38D indicated in FIG. 2 and used herein to identify the row. Four rows of rotor slots are depicted at each of the poles P1-P8. Each center axis 38A, 38B, 38C, 38D curves outward, away from the axis of rotation A, such that the center axis is arranged along an arcuate curve that is convex toward the axis of rotation A.

Figure 2:
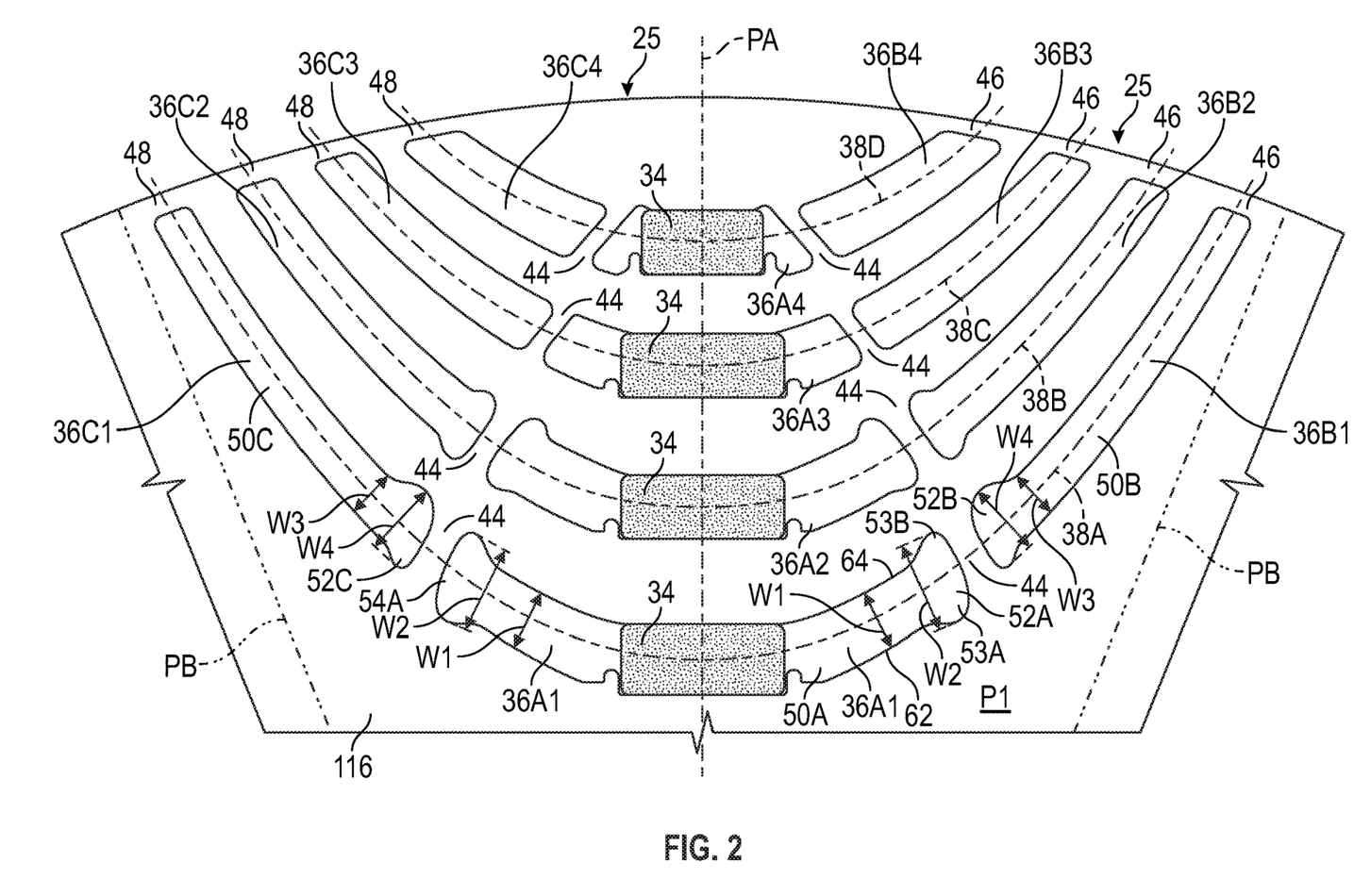
FIG. 2 is a schematic illustration in fragmentary side view of a portion of a rotor core of the electric machine of FIG. 1.

Each row includes three rotor slots: a respective central rotor slot 36A1, 36A2, 36A3, or 36A4, a respective first outer rotor slot 36B1, 36B2, 36B3, or 36B4, and a respective second outer rotor slot 36C1, 36C2, 36C3, or 36C4, with the central rotor slot between the first outer rotor slot and the second outer rotor slot along the respective center axis 38A, 38B, 38C, 38D. The center axis can be linear or circular, parabolic, hyperbolic, or any conical shape. In other embodiments, each row could include a different number of rotor slots. The rotor slots may be stamped into laminations which are then stacked to form the rotor core 16. The rows of rotor slots may also be referred to herein as barriers or barrier layers, arranged as multiple barrier layers including a first barrier layer (the rotor slots arranged along center axis 38A), a second barrier layer (the rotor slots arranged along center axis 38B), a third barrier layer (the rotor slots arranged along center axis 38C), and a fourth barrier layer (the rotor slots arranged along center axis 38D). In the embodiments shown, the central rotor slots 36A1, 36A2, 36A3, and 36A4 house magnets 34 and the other rotor slots do not hold magnets. In other embodiments, different ones of the rotor slots may house magnets, or each one of the rotor slots may house magnets.

The central rotor slots 36A1, 36A2, 36A3, 36A4, first outer rotor slots 36B1, 36B2, 36B3, 36B4, and second outer rotor slots 36C1, 36C2, 36C3, 36C4 extend through the rotor core 16 from a first axial end face 40 shown in FIG. 1, to a second axial end face (not shown, but identical to the first axial end face 40, and parallel with the first axial end face 40 but spaced along the rotational axis A from the first axial end face 40 by the width of the rotor core 16). When referring to the rotor slots generally, the reference numeral 36 may be used herein.

Although the center axis 38A, 38B, 38C, 38D of each row is shown as arcuate, the center axis could instead be angled. For example, the center axis 38A could instead have a straight segment at the central rotor slot 36A1, and two straight segments angling outward from the central rotor slot 36A1 through the first outer rotor slot 36B1 and through a second outer rotor slot 36C1 respectively.

The first row of rotor slots 36A1, 36B1, 36C1 is closest to the inner surface 24 of the rotor core 16. The fourth row of rotor slots 36A4, 36B4, and 36C4 is furthest from the inner surface 24 and closest to the outer surface 25 of the rotor core 16. The second row of rotor slots 36A2, 36B2, 36C2 and the third row of rotor slots 36A3, 36B3, and 36B3 are between the first and the fourth rows. Although four rows of rotor slots in groups of three are shown, fewer or more rows could be used.

Referring now to FIG. 2, the first outer rotor slots 36B1, 36B2, 36B3, and 36B4 are separated from the central rotor slots 36A1, 36A2, 36A3, and 36A4 along the respective center axis 38A, 38B, 38C, and 38D by material of the rotor core 16 referred to as webs 44. Stated differently, the rotor core 16 defines webs 44 between adjacent ends of the first outer rotor slots 36B1, 36B2, 36B3, and 36B4 and the central rotor slots 36A1, 36A2, 36A3, and 36A4 along the respective center axes 38A, 38B, 38C, and 38D. Similarly, the second outer rotor slots 36C1, 36C2, 36C3, and 36C4 are separated from the central rotor slots 36A1, 36A2, 36A3, and 36A4 along the respective center axis 38A, 38B, 38C, and 38D by material of the rotor core 16 referred to as webs 44. Accordingly, the rotor core 16 defines webs 44 between adjacent ends of the second outer rotor slots 36C1, 36C2, 36C3, and 36C4 and the central rotor slots 36A1, 36A2, 36A3, and 36A4 along the respective center axes 38A, 38B, 38C, 38D. Each rotor slot is thus physically separated from the adjacent slots by material of the rotor core 16. The central rotor slots 36A1, 36A2, 36A3, and 36A4 are positioned at each respective pole P1-P8 so that the magnets 34 housed therein are generally perpendicular to a radius of the rotor core 16, with one radius being shown as and represented by the pole axis PA.

The first outer rotor slots 36B1, 36B2, 36B3, and 36B4 are separated from the outer surface 25 of the rotor core 16 along the respective center axes 38A, 38B, 38C, 38D by material of the rotor core 16 at bridges 46, referred to as first bridges. The second outer rotor slots 36C1, 36C2, 36C3, and 36C4 are also separated from the outer surface 25 of the rotor core 16 along the respective center axes 38A, 38B, 38C, 38D by material of the rotor core 16 at bridges 48, referred to as second bridges.

The webs 44 and bridges 46, 48 are the thinnest regions of the rotor core 16 and are the regions of greatest rotational stress in the rotor core 16. In order to reduce the stress borne at the webs 44 and/or the bridges 46, 48, the rotor core 16 is configured so that an end portion of a rotor slot adjacent to and partially defining the web 44 or the bridge 46, 48 is provided with a specific geometry. First, one or both end portions of the rotor slot is made wider than a central portion of the rotor slot. For example, as shown in FIG. 2, the central rotor slot 36A1 has a central portion 50A that has a maximum width W1. The central rotor slot 36A1 also has a first end portion 52A and a second end portion 54A, each of which has a maximum width W2 that is greater than the maximum width W1 of the central portion 50A immediately adjacent the first end portion 52A and also immediately adjacent the second end portion 54A. The maximum width W1 is measured perpendicular to the center axis 38A of the central portion immediately adjacent the end portion 52A and also immediately adjacent the end portion 54A. As used herein, a maximum width of a central portion immediately adjacent an end portion is the width measured in the central portion just prior to the perimeter of the slot moving outward away from the center axis (e.g., center axis 38A), such as toward an inflection point IP1 or IP2. Further away from the end portion along the central axis, the central portion 50A could have a width that is greater than the width of the end portion 52A. For example, where the magnet 34 is disposed in the central portion 50A could be wider than the maximum width W2 of the end portion 52A. However, by keeping the maximum width W1 immediately adjacent the end portion 52A less than the maximum width W2 of the end portion 52A, the dog bone shape discussed herein that reduces stress is achieved. The maximum width W2 of the end portions 52A and 54A is measured parallel to the maximum width W1 of the central portion 50A (i.e., also perpendicular to the center axis 38A). As seen in FIG. 2, the added width of the end portion 52A or 54A (i.e., the difference between W2 and W1) is distributed on either side of the center axis 38A so that the end portions 52A, 54A flare out above and below the center axis 38A relative to the central portion 50A to form a first lobe 53A and a second lobe 53B. The first lobe 53A extends further away from the center axis 38A than the first side 62 of central portion 50A, and second lobe 53B extends further away from the center axis 38A than the second side 64 of the central portion 50A.

The one or more of the rotor slots 36 is also configured to reduce stress at an adjacent web 44 or bridge 46, 48 by providing a perimeter of the rotor slot at the end portion with a specific geometry. For example, referring to FIG. 3, the end portion 52A of rotor slot 36A1 is shown in greater detail. The perimeter 60A of rotor slot 36A1 at the end portion 52A includes a plurality of segments S4, S3, S2, S1, SA, SB, SC extending in order between a first extremity E1 at the maximum width W2 of the end portion 52A and a second extremity E2 at the maximum width W2 of the end portion 52A. Segment S4 extends from the first extremity E1 to point T1. Segment S3 extends from point T1 to point T2. Segment S2 extends from point T2 to point T3. Segment S1 extends from point T3 to point T4. Segment SA extends from point T4 to point T5. Segment SB extends from point T5 to point T6. Segment SC extends from point T6 to the second extremity E2.

Figure 3:
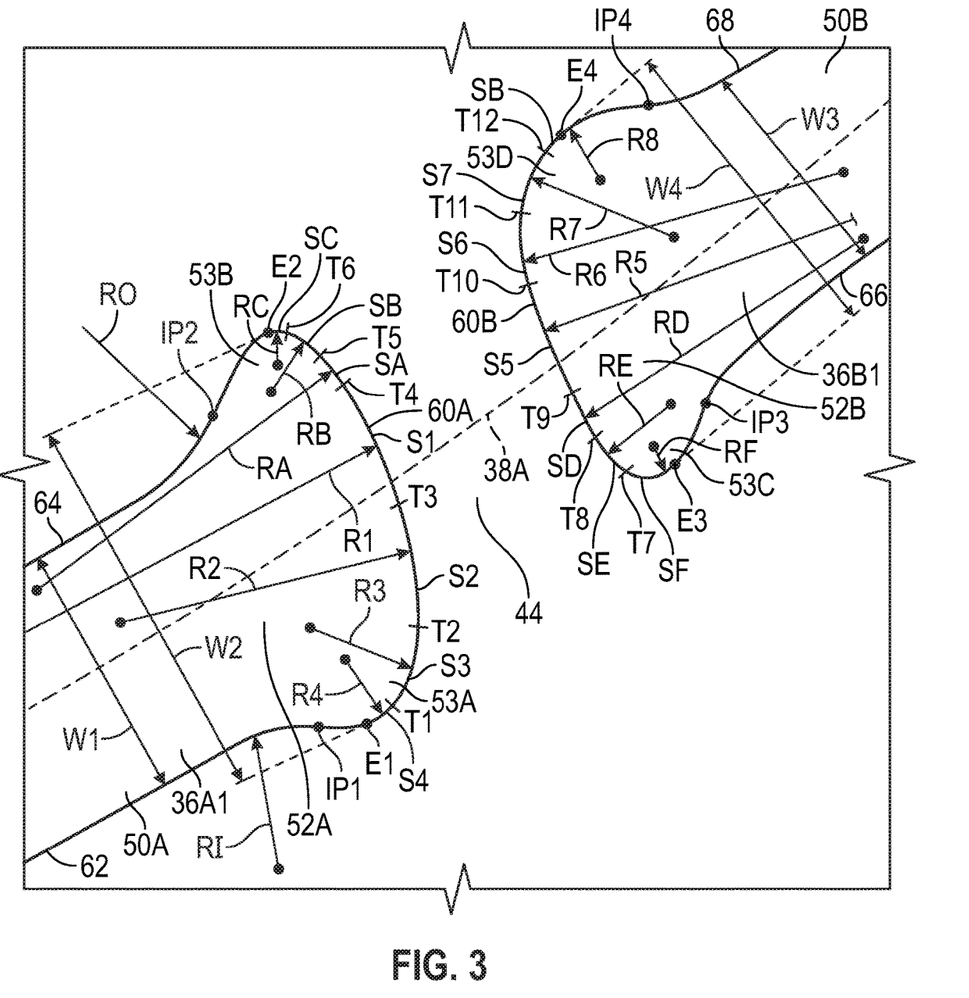
FIG. 3 is a schematic illustration in fragmentary side view of a portion of the rotor core of FIG. 2 showing end portions of rotor slots defining a web.

Each of the plurality of segments S4, S3, S2, S1, SA, SB, and SC has a different radius R4, R3, R2, R1, RA, RB, and RC, respectively, of a different magnitude. Additionally, the radii decrease in magnitude from the center axis 38A to the first extremity E1, and from the center axis 38A to the second extremity E2. In FIG. 3, the segment S1 is at the center axis 38A. Accordingly, the radii decrease in magnitude in the order R1, R2, R3, and R4 from the center axis 38A to the first extremity E1. Stated differently, the magnitude of radius R1 is greater than the magnitude of radius R2, the magnitude of radius R2 is greater than the magnitude of radius R3, and the magnitude of radius R3 is greater than the magnitude of radius R4. The radii also decrease in magnitude in the order R1, RA, RB, and RC from the center axis 38A to the second extremity E2. Accordingly, the magnitude of radius R1 is greater than the magnitude of radius RA, the magnitude of radius RA is greater than the magnitude of radius RB, and the magnitude of radius RB is greater than the magnitude of radius RC.

The end portion 52A has a shape that may be referred to as a "dog bone" shape. As shown in FIG. 2, the central slot 36A1 is symmetrical about its pole axis PA, so that end portion 54A has an identical geometry and shape as end portion 52A. Seven segments S4, S3, S2, S1, SA, SB, and SC of different radii are identified along the perimeter 60A between the extremities E1, E2. In other embodiments, there may be more or fewer segments with radii decreasing in magnitude from the center axis 38A to the respective extremities E1, E2, but in each embodiment there are at least three segments of different radii between the first extremity E1 and the second extremity E2.

As shown, each segment S1, S2, S3, S4, SA, SB, SC is an arc of a different circle having a different radius. In other embodiments, some of the segments may be relatively short linear segments, but each having a different radius. When each such linear segment has a relatively short length, substantially equivalent stress reduction can be achieved as with arcuate segments.

Each point of the perimeter 60A along the plurality of segments is in a tangency condition to the radius at the point, which also helps to reduce rotational stress concentrations. Stated differently, a line may be drawn tangent to the perimeter 60A of the rotor slot 36A1 at every point along the plurality of segments S4, S3, S2, S1, SA, SB, SC, including at each point at which two adjacent segments are joined (i.e., at the points T1, T2, T3, T4, T5, and T6, which may be referred to as transition points). In such an embodiment, for example, there are no portions of the perimeter 60A that the slope of the tangent resembles a step function.

The perimeter 60A of the rotor slot 36A1 has a first inflection point IP1 between the first side 62 of the central portion 50A and the end portion 52A. The perimeter 60A also has a second inflection point IP2 between the second side 64 of the central portion 50A and the end portion 52A. An inflection point is a point on a curve at which the sign of the curvature (i.e., the concavity) changes. Between the first inflection point IP1 and the first side 62, the radius of curvature RI of the perimeter 60A is on the opposite side of the perimeter 60A than the radii R2, R3, and R4. Between the second inflection point IP2 and the second side 64, the radius of curvature RO of the perimeter 60A is on the opposite side of the perimeter than the radii RA, RB, RC. The radius of curvature RO is greater than the radius of curvature RI.

The end portion 52A is asymmetrical because the radii of a first set of the plurality of segments (i.e., of segments S2, S3 and S4) between the center axis 38A and the first extremity E1 are different than the radii of a second set of the plurality of segments (i.e., of segments SA, SB, SC) between the center axis 38A and the second extremity E2. The radii of segments S2, S3 and S4 are larger than the radii of segments SA, SB, and SC so that the end portion 52A forms a larger lobe 53A at the segments S2, S3, S4 than the lobe 53B at the segments SA, SB, SC. The fact that the radius RO is larger than the radius RI also contributes to the asymmetry of the lobes 53A, 53B of the end portion 52A. In other embodiments, the end portion could be symmetrical.

By way of non-limiting example, a computer-based rotational stress analysis of the rotor core 16 indicates that the webs 44 and bridges 46, 48 experience the greatest rotational stress, and that an end portion of a rotor slot adjacent to and partially defining one of the webs 44 or one of the bridges 46 or 48 shaped with a maximum width W2 greater than the maximum width W1, and a perimeter with multi-radii segments as described above results in a lower stress at the adjacent web 44 or bridge 46 or 48 in comparison to a rotor slot in which the end portion has a different shape, such as a width equal to that of the central portion and/or a perimeter with a straight central segment connected to each side of the central portion with a single radius segment. For example, finite element analysis indicates that maximum stress in the rotor core 16 may be reduced 33 percent, and maximum motor torque may be increased 3 percent.

The rotor slot 36A1 may be referred to as a first rotor slot, and the adjacent rotor slot 36B1 may be referred to as a second rotor slot. As shown in FIGS. 2 and 3, the rotor slot 36B1 has a central portion 50B and an end portion 52B. The end portion 52B of the second rotor slot 36B1 is separated from the end portion 52A of the first rotor slot 36A1 by a web 44 of the rotor core 16. Similar to end portion 52A, the end portion 52B has a maximum width W4 between a first extremity E3 and a second extremity E4 that is greater than a maximum width W3 of the central portion 50B immediately adjacent the end portion 52B. The maximum width W4 of the central portion 50B is measured perpendicular to the center axis 38A of the central portion 50B, and the maximum width W4 of the end portion 52B is parallel to the maximum width W3.

A perimeter 60B of the second rotor slot 36B1 at the end portion 52B is similar in shape to end portion 52A, but "flipped" so that the smaller lobe 53C is nearer the axis of rotation than the larger lobe 53D. This orientation complements the opposite orientation of the lobes of end portion 52A so that the width of the web 44 changes more uniformly in either direction away from the central axis 38A.

Like perimeter 60A, perimeter 60B includes a plurality of segments extending between the first extremity E3 and the second extremity E4. The plurality of segments SD, SE, SF of the perimeter 60A have different radii RD, RE, RF, respectively, that decrease in magnitude from the center axis 38A to the first extremity E3, and a plurality of segments S5, S6, S7, S8 have different radii R5, R6, R7, R8 that decrease in magnitude from the center axis 38A to the second extremity E4. Segment SF extends from the first extremity E3 to point T7. Segment SE extends from point T7 to point T8. Segment SD extends from point T8 to point T9. Segment S5 extends from point T9 to point T10. Segment S6 extends from point T10 to point T11. Segment S7 extends from point T11 to point T12. The perimeter 60B has an inflection point IP3 between the first extremity E3 and the side 66 of the central portion 50B, and a second inflection point IP4 between the side 68 of the central portion 50B and the second extremity E4.

The second outer rotor slot 36C1 shown in FIG. 2 may be referred to as the third rotor slot of the first row of rotor slots 36A1, 36B1, 36C1. The third rotor slot 36C1 and the second rotor slot 36B1 are symmetrical with one another relative to the first rotor slot 36A1. The end portion 52A of the first rotor slot 36A1 is a first end portion of the first rotor slot 36A. The web 44 between the rotor slots 36A1 and 36B1 is referred to as a first web. The first rotor slot 36A1 has a second end portion 54A configured symmetrically to the first end portion 52A, and separated from the third rotor slot 36C1 by a second web 44 of the rotor core 16. The first outer rotor slot (i.e., second rotor slot 36B1) tapers in width from the first end portion 52B to the first bridge 46, and the second outer rotor slot (i.e., third rotor slot 36C1) tapers in width from the first end portion 52C to the second bridge 48.

A first end portion 52C of the third rotor slot 36C1 is adjacent to the second end portion 54A of the first rotor slot 36A1. Because rotor slots 36B1 and 36C1 are symmetrical, like end portion 52B described with respect to FIG. 3, a perimeter of the third rotor slot 36C1 at the first end portion 52C has a maximum width greater than a maximum width of a central portion 50C of the third rotor slot immediately adjacent the first end portion 52C such that the rotor core 16 has a second web 44 bounded by the second end portion 54A of the first rotor slot 36A1 and the first end portion 52C of the third rotor slot 36C1.

Figure 4:
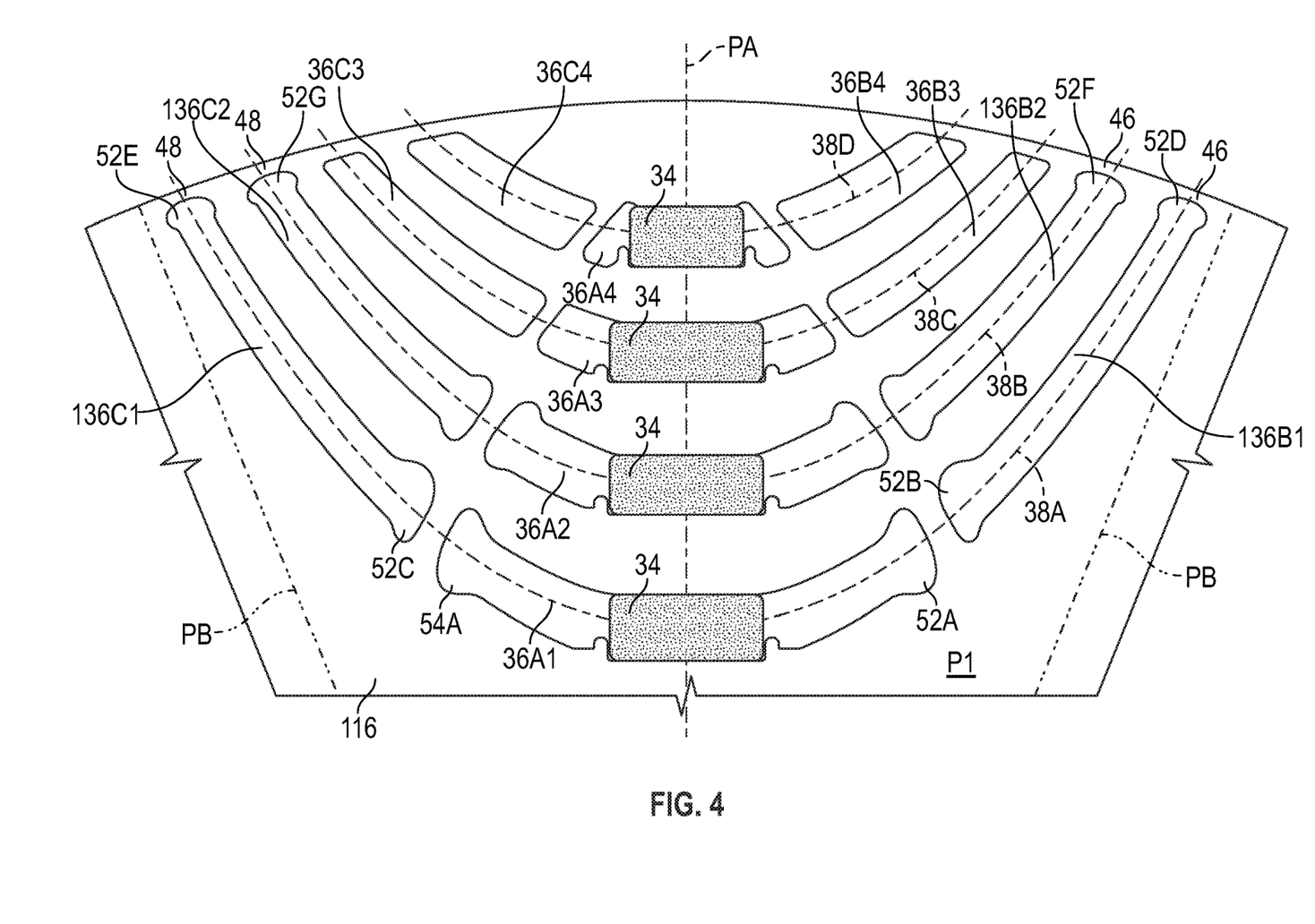
FIG. 4 is a schematic illustration in fragmentary side view of a portion of an alternative rotor core for the electric machine of FIG. 1 in accordance with the present teachings.

FIG. 4 shows an alternative rotor core 116 for use in the electric machine 10 of FIG. 1. The rotor core 116 is the same as rotor core 16 except that rotor slots 36B1, 36B2, 36C1, and 36C2 are replaced with rotor slots 136B1, 136B2, 136C1, and 136C2. Rotor slots 136B1, 136B2, 136C1, and 136C2 differ from rotor slots 36B1, 36B2, 36C1, and 36C2 in that end portions 52D, 52E, 52F, and 52G are added adjacent the respective bridge portions 46, 48. The bridges 46 may be referred to as first bridges, and the bridges 48 may be referred to as second bridges. End portion 52D is symmetrical to and has the geometrical features of end portion 52B, except that it is smaller in ratio in light of the tapered width of the central portion of rotor slot 136B1. Similarly, end portion 52E is symmetrical to and has the geometrical features of end portion 52C, except that it is smaller in ratio in light of the tapered width of the central portion of rotor slot 136C1. The end portions 52F and 52G in rotor slots 136B2 and 136C2 also have the geometrical features described with respect to end portion 52B. Accordingly, each of the rotor slots of the first and second rows in rotor core 116 have a dog bone shape at both ends. The end portions 52D, 52E, 52F, and 52G reduce stress at the adjacent bridges 46, 48 relative to an end portion having a perimeter with a straight segment and a single radius of curvature connecting the end segment to the sides of the rotor slot.

While the best modes for carrying out the disclosure have been described in detail, those familiar with the art to which this disclosure relates will recognize various alternative designs and embodiments for practicing the disclosure within the scope of the appended claims.

What is claimed is:

1. A rotor for an electric machine comprising:
a rotor core that defines a first rotor slot having a central portion and an end portion with the central portion and the end portion extending along a center axis of the first rotor slot;
wherein the end portion has a maximum width that is greater than a maximum width of the central portion immediately adjacent the end portion; and
wherein a perimeter of the first rotor slot at the end portion includes a plurality of segments extending between a first extremity at the maximum width of the end portion and a second extremity at the maximum width of the end portion, the plurality of segments including segments with radii that decrease in magnitude from the center axis to the first extremity, and from the center axis to the second extremity;
wherein the rotor core further defines a second rotor slot having a central portion and an end portion;
wherein the end portion of the second rotor slot is separated from the end portion of the first rotor slot by a web of the rotor core;
wherein the end portion of the second rotor slot has a maximum width that is greater than a maximum width of the central portion of the second rotor slot immediately adjacent the end portion of the second rotor slot; and
wherein a perimeter of the second rotor slot at the end portion of the second rotor slot includes a plurality of segments extending between a first extremity at the maximum width of the end portion of the second rotor slot and a second extremity at the maximum width of the end portion of the second rotor slot, the plurality of segments of the perimeter of the second rotor slot at the end portion of the second rotor slot including segments having different radii that decrease in magnitude from a center axis of the second rotor slot to the first extremity at the maximum width of the end portion of the second rotor slot, and from the center axis of the second rotor slot to the second extremity at the maximum width of the end portion of the second rotor slot.

2. The rotor of claim 1, wherein the center axis of the first rotor slot is arcuate.

3. The rotor of claim 1, wherein each point of the perimeter of the first rotor slot along the plurality of segments is in tangency condition to the radius at the point.

4. The rotor of claim 1, wherein the radii of a first set of the plurality of segments between the center axis of the first rotor slot and the first extremity at the maximum width of the end portion of the first rotor slot are different than the radii of a second set of the plurality of segments between the center axis of the first rotor slot and the second extremity at the maximum width of the end portion of the first rotor slot such that the end portion of the first rotor slot is asymmetrical.

5. The rotor of claim 1, wherein the perimeter of the first rotor slot has a first inflection point between a first side of the central portion of the first rotor slot and the end portion of the first rotor slot, and a second inflection point between a second side of the central portion of the first rotor slot and the end portion of the first rotor slot.

6. The rotor of claim 1, wherein:
the rotor core further defines a third rotor slot;
the third rotor slot and the second rotor slot are symmetrical with one another relative to the first rotor slot; and
the end portion of the first rotor slot is a first end portion, the web is a first web, and the first rotor slot has a second end portion configured symmetrically to the first end portion and separated from the third rotor slot by a second web of the rotor core.

7. The rotor of claim 1, wherein the end portion of the first rotor slot is adjacent to an outer surface of the rotor core such that the rotor core includes a bridge between the end portion of the first rotor slot and the outer surface.

8. The rotor of claim 1, wherein:
the end portion of the first rotor slot is a first end portion, and the first rotor slot has a second end portion configured symmetrically to the first end portion; and
the center axis of the central portion of the first rotor slot is arcuate with the central portion of the first rotor slot closer to an axis of rotation of the rotor than the first end portion and the second end portion.

9. The rotor of claim 8, wherein:
the rotor core, further includes a third rotor slot, with the first rotor slot between the second rotor slot and the third rotor slot;
the end portion of the second rotor slot is a first end portion of the second rotor slot and is adjacent to the first end portion of the first rotor slot, and the perimeter of the second rotor slot at the first end portion of the second rotor slot has a maximum width greater than the maximum width of the central portion of the second rotor slot immediately adjacent the first end portion of the second rotor slot such that the web is a first web bounded by the first end portion of the first rotor slot and the first end portion of the second rotor slot; and
a first end portion of the third rotor slot is adjacent to the second end portion of the first rotor slot, and a perimeter of the third rotor slot at the first end portion of the third rotor slot has a maximum width greater than a maximum width of a central portion of the third rotor slot immediately adjacent the first end portion of the third rotor slot such that the rotor core has a second web bounded by the second end portion of the first rotor slot and the first end portion of the third rotor slot.

10. The rotor of claim 9, further comprising:
a magnet disposed in the first rotor slot; and
wherein the second rotor slot and the third rotor slot are each free of any magnet.

11. The rotor of claim 9, wherein the center axis of each of the first, second, and third rotor slots is arranged along an arcuate curve that is convex toward the axis of rotation.

12. A rotor for an electric machine comprising:
a rotor core that defines a rotor slot having a central portion and an end portion with the central portion and the end portion extending along a center axis of the rotor slot;
wherein the end portion has a maximum width that is greater than a maximum width of the central portion immediately adjacent the end portion;
wherein a perimeter of the rotor slot at the end portion includes a plurality of segments extending between a first extremity at the maximum width of the end portion and a second extremity at the maximum width of the end portion, the plurality of segments including segments with radii that decrease in magnitude from the center axis to the first extremity, and from the center axis to the second extremity;
wherein the rotor core defines a plurality of rotor slots arranged in rows of three, each row including a central rotor slot, a first outer rotor slot, and a second outer rotor slot, with the central rotor slot between the first outer rotor slot and a second outer rotor slot;
wherein the rotor core includes a first web between the central rotor slot and the first outer rotor slot, a second web between the central rotor slot and the second outer rotor slot, a first bridge between the first outer rotor slot and an outer perimeter of the rotor core, and a second bridge between the second outer rotor slot and the outer perimeter of the rotor core;
wherein the rotor slot is the central rotor slot of an innermost row of the rows of three closest to an axis of rotation of the rotor core, the end portion is a first end portion of the central rotor slot, and the central rotor slot has a second end portion configured symmetrically to the first end portion of the central rotor slot; and
wherein a perimeter of the first outer rotor slot at a first end portion of the first outer rotor slot adjacent the first web includes a plurality of segments each having a different radius, a perimeter of the second outer rotor slot at a first end portion of the second outer rotor slot adjacent the second web includes a plurality of segments each having a different radius, the first outer rotor slot tapers in width from the first end portion of the first outer rotor slot to the first bridge, and the second outer rotor slot tapers in width from the first end portion of the second outer rotor slot to the second bridge.

13. The rotor of claim 12, wherein the rows of three include four rows between the axis of rotation and the outer perimeter of the rotor core at each rotor pole of the rotor; and the rotor further comprising:
respective magnets disposed in the central rotor slot of each row; and
wherein the first outer rotor slot and the second outer rotor slot are each free of any magnet.

14. An electric machine comprising:
a rotor including:
a rotor core defining a plurality of rotor slots extending therethrough and disposed between an inner surface of the rotor core and an outer surface of the rotor core; and
magnets supported by the rotor core in at least some of the rotor slots of the plurality of rotor slots; wherein the magnets are spaced around an axis of rotation of the rotor core to define a number of rotor poles;

wherein the plurality of rotor slots includes a first rotor slot having a central portion and an end portion both extending along an arcuate center axis of the first rotor slot;

wherein the end portion has a maximum width that is greater than a maximum width of the central portion immediately adjacent the end portion;

wherein a perimeter of the first rotor slot at the end portion includes a plurality of segments extending between a first extremity at the maximum width of the end portion and a second extremity at the maximum width of the end portion, the plurality of segments including segments with different radii that decrease in magnitude from the arcuate center axis to the first extremity, and from the arcuate center axis to the second extremity;

wherein each point of the perimeter of the first rotor slot along the segments with different radii is in a tangency condition to the radius at the point;

wherein the perimeter of the first rotor slot has a first inflection point between a first side of the central portion and the end portion, and a second inflection point between a second side of the central portion and the end portion;

wherein the plurality of rotor slots further includes a second rotor slot having a central portion and an end portion; wherein the end portion of the second rotor slot is separated from the end portion of the first rotor slot by a web of the rotor core;

wherein the end portion of the second rotor slot has a maximum width that is greater than a maximum width of the central portion of the second rotor slot immediately adjacent the end portion of the second rotor slot;

wherein the maximum width of the central portion of the second rotor slot is perpendicular to a center axis of the second rotor slot, and the maximum width of the end portion of the second rotor slot is parallel to the maximum width of the central portion; and wherein a perimeter of the second rotor slot at the end portion of the second rotor slot includes a plurality of segments extending between a first extremity at the maximum width of the end portion of the second rotor slot and a second extremity at the maximum width of the end portion of the second rotor slot, the plurality of segments of the perimeter of the second rotor slot at the end portion of the second rotor slot having different radii that decrease in magnitude from the center axis of the second rotor slot to the first extremity at the maximum width of the end portion of the second rotor slot, and from the center axis of the second rotor slot to the second extremity at the maximum width of the end portion of the second rotor slot.

15. The electric machine of claim 14, wherein the radii of a first set of the plurality of segments between the arcuate center axis and the first extremity are different than the radii of a second set of the plurality of segments between the arcuate center axis and the second extremity such that the end portion is asymmetrical.

16. The electric machine of claim 14, wherein the end portion of the first rotor slot is adjacent to an outer surface of the rotor core such that the rotor core includes a bridge between the end portion of the first rotor slot and the outer surface.

17. The electric machine of claim 14, wherein:
the end portion of the first rotor slot is a first end portion, and the first rotor slot has a second end portion configured symmetrically to the first end portion; and
the central portion of the first rotor slot is closer to the axis of rotation than the first end portion and the second end portion.

18. The electric machine of claim 14, wherein:
the plurality of rotor slots is arranged in rows of three, each row including a central rotor slot, a first outer rotor slot, and a second outer rotor slot, with the central rotor slot between the first outer rotor slot and a second outer rotor slot;
the first rotor slot is the central rotor slot of one of the rows of three; and
the web is a first web between the central rotor slot and the first outer rotor slot, and the rotor core includes a second web between the central rotor slot and the second outer rotor slot, a first bridge between the first outer rotor slot and an outer perimeter of the rotor core, and a second bridge between the second outer rotor slot and the outer perimeter of the rotor core.

* * * * *